D. Steinberg,
Plate for Artificial Teeth.
No. 38,703. Patented May 26, 1863.

Witnesses:
Thos. H. Lock
Chas. Wesley

Inventor:
David Stanberg

UNITED STATES PATENT OFFICE.

DAVID STEINBERG, OF SAN FRANCISCO, CALIFORNIA.

IMPROVEMENT IN BASES FOR ARTIFICIAL TEETH.

Specification forming part of Letters Patent No. 38,703, dated May 26, 1863.

*To all whom it may concern:*

Be it known that I, DAVID STEINBERG, of the city and county of San Francisco, in the State of California, have invented a new and useful improvement on my invention No. 33,716, (for which Letters Patent were issued to me on the 12th day of November, A. D. 1861,) for an improvement in setting artificial teeth, consisting of a series of bars for securing and strengthening the vulcanized rubber or other substances, as employed by my process; and I do hereby declare that the following is a full, clear, and exact description of the same, reference being had to the accompanying drawings, forming part of this specification, in which—

Figure 1:
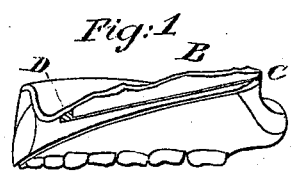
Figure 2:
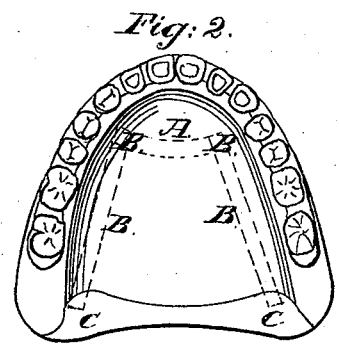
Figure 3:
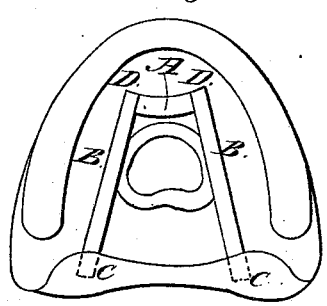

Figure 1 is a sectional view exhibiting the manner of placing a series of bars in a plate or set of teeth. Fig. 2 is an upper set of teeth containing the bars and vulcanized rubber, the dotted lines showing the mode of placing said bars. Fig. 3 represents the gold plate before the vulcanized substances are impressed, and the green-tinted spaces show the position of the bars.

The object and application of my improvement, which I have recently practically used and employed, are for the purpose of providing a skeleton frame of three or more metallic bars, (as will be seen in the accompanying sketches,) in such manner as to secure strength and durability to a set of artificial teeth, and as applicable to any and all kinds of plates, in combination with any of the gums employed for making artificial gum-plates.

To enable others skilled in that profession to make and use my invention and improvement, I will proceed to describe the mode of placing said bars and the application of the same.

I apply to any metallic gum-plate for artificial teeth, which has been previously prepared for the reception of gum or vulcanized substances, a metallic bar, A, which at each end is bent at right angles, forming rests so that the same may be soldered or secured to the gum-plate, as shown in Fig. 3.

B B are two more such metallic bars, only one end of each of which is bent or may be left straight, as deemed best by the operator, to be soldered to each end of the bar A and to the gold lapping C. These bars may be placed, however, in any other manner, and are principally advantageous in giving strength to the gum or vulcanized substances and add firmness and durability to the same.

It is a well-established fact that in the lath-and-plastering process the laths serve materially in holding firmly the coating of plaster, as also in my improvement I assert that the bars A B B answer the same purpose. The space around said bars allows the gum or vulcanized substances to be impressed in and around said bars, and the plate, when introduced into the furnace for vulcanizing, is likewise secured against warping through the addition of said bars or laths.

In Fig. 1 I represent a sectional view showing the bar B as held between the vulcanized rubber. D shows the bent end or rest as soldered to the plate. Said bars or laths may be round or of angular shape.

What I claim as my improvement, and which I desire to secure by Letters Patent, is—

The application of the bars A B B, substantially as set forth, and for the purposes described herein.

DAVID STEINBERG.

Witnesses:
THOS. H. LÖEHR,
CHAS. C. WESTERN.